(12) United States Patent
Moehl et al.

(10) Patent No.: US 7,306,830 B2
(45) Date of Patent: Dec. 11, 2007

(54) METHOD FOR COATING THE QUARTZ BURNER OF AN HID LAMP

(75) Inventors: Wolfgang Moehl, Worms (DE); Lars Bewig, Bad Gandorsheim (DE); Thomas Kuepper, Bad Gandersheim (DE); Wolfram Maring, Hamburg (DE); Christopher Moelle, Bad Gandersheim (DE)

(73) Assignee: Schott AG, Mainz (DE)

( * ) Notice: Subject to any disclaimer, the term of this patent is extended or adjusted under 35 U.S.C. 154(b) by 184 days.

(21) Appl. No.: 10/502,408

(22) PCT Filed: Jan. 28, 2003

(86) PCT No.: PCT/EP03/00827

§ 371 (c)(1),
(2), (4) Date: Apr. 7, 2005

(87) PCT Pub. No.: WO03/006650

PCT Pub. Date: Aug. 14, 2003

(65) Prior Publication Data

US 2005/0163939 A1    Jul. 28, 2005

(30) Foreign Application Priority Data

Feb. 2, 2002    (DE) ............................... 102 04 363

(51) Int. Cl.
  *H05H 1/24*    (2006.01)
  *H01J 61/40*   (2006.01)

(52) U.S. Cl. .................. 427/569; 313/113; 313/114; 313/635

(58) Field of Classification Search ............. 427/569; 313/113, 114, 635
See application file for complete search history.

(56) References Cited

U.S. PATENT DOCUMENTS 4,099,840 A * 7/1978 van der Wal et al. ....... 359/588

(Continued)

FOREIGN PATENT DOCUMENTS

DE    34 30 727 A1    4/1985

(Continued)

OTHER PUBLICATIONS

Walther, M et al., Multilayer barrier coating system produced by plasma-impulse chemical vapor deposition (PICVD), Surface and Coating Technology, 80,(1996) pp. 200-202.*

(Continued)

*Primary Examiner*—William Phillip Fletcher, III
*Assistant Examiner*—Cachet Sellman
(74) *Attorney, Agent, or Firm*—Michael J. Striker

(57) ABSTRACT

In order to improve the energy balance of an HID lamp, the quartz burner, preferably the inside thereof, is coated with a UV reflecting layer system by alternatingly applying amorphous thin layers made at least of titanium oxide and silicon oxide having the respective general stoichiometry $TiO_y$ and $SiO_x$ by means of a plasma impulse chemical vapor deposition (PICVD) method at a high power density and increased substrate temperatures ranging from 100° to 400° C., using small growth rates ranging from 1 nm/sec to 100 nm/sec so as to form an interference layer system having a thickness of less than 1200 nm and a minimized UV-active defective spot rate ranging from 0.1 to 1 percent.

12 Claims, 1 Drawing Sheet

U.S. PATENT DOCUMENTS

| | | | |
|---|---|---|---|
| 4,634,919 A | | 1/1987 | Yuge et al. |
| 5,034,719 A | | 7/1991 | Brown et al. |
| 5,147,125 A | * | 9/1992 | Austin ................ 359/359 |
| 5,154,943 A | * | 10/1992 | Etzkorn et al. ......... 427/569 |
| 5,177,400 A | | 1/1993 | Iwasaki |
| 5,270,615 A | * | 12/1993 | Chang ................ 313/635 |
| 5,608,227 A | | 3/1997 | Dierks et al. |
| 5,736,207 A | | 4/1998 | Walther |

FOREIGN PATENT DOCUMENTS

| | | | |
|---|---|---|---|
| DE | 3819878 A1 | * | 12/1989 |
| DE | 38 30 089 A | | 3/1990 |
| DE | 40 08 400 A1 | | 10/1990 |
| DE | 41 15 437 A1 | | 11/1991 |
| DE | 44 32 315 A1 | | 3/1996 |
| DE | 44 38 359 A1 | | 5/1996 |
| DE | 195 30 797 A1 | | 2/1997 |
| DE | 199 62 144 A | | 6/2001 |
| EP | 1 158 566 A | | 11/2001 |
| JP | 06068850 A | * | 3/1994 |
| RU | 2024988 C1 | * | 12/1994 |

OTHER PUBLICATIONS

M. Walther et al: "Multilayer Barrier Coating System Produced by Plasma-Impulse . . . " Surface and Coatings Technology 80 (1996), pp. 200-202.

* cited by examiner

METHOD FOR COATING THE QUARTZ BURNER OF AN HID LAMP

CROSS-REFERENCE

The invention described and claimed hereinbelow is also described in POT/EP 03100827, filed on Jan. 28, 2003 and DE 102 04 363.9, filed Feb. 2, 2002. This German Patent Application, whose subject matter is incorporated here by reference, provides the basis for a claim of priority of invention under 35 U.S.C. 119(a)-(d).

BACKGROUND OF THE INVENTION

The present invention relates to a method for coating a quartz burner of a HID lamp with a UV-reflecting layer system.

For illumination purposes with high illuminance, high-intensity or high intensity-discharge (HID) lamps are used which have a plasma quartz burner as the lamp, the lamp being located inside a tubular jacket.

UV photons, which excite the atoms in the plasma to generate light in the visible range, play a central role in generating light in the plasma in the burner of HID lamps. With the known HID lamps, however, large UV photon fluxes leave the quartz burner unused. As such, the energy efficiency of the HID lamp is reduced.

The unused escaping of the UV photon fluxes could be reduced significantly if the quartz burner can be provided with a UV-reflecting layer system, which must be able to last for the entire service life of the lamp, however. Due to the aggressive plasma medium in the quartz burner and the high operating temperatures of the burner, this cannot be easily ensured, however.

UV-reflecting layer systems on different substrates are known from various publications, and they will be described individually hereinbelow. These known layer systems have not resulted in the desired success with quartz burners for HID lamps. One reason is that the coating step itself has proven difficult. Another reason is that no notable improvements in the energy balance were achieved.

SUMMARY OF THE INVENTION

The object of the present invention is to create a method for coating a quartz burner of a HID lamp with a UV-reflecting layer system which is capable of being applied to the quartz burner with relatively simple means, which has a sufficient, adapted service life, and brings about a notable improvement in the energy balance.

This object is attained according to the present invention by alternatingly applying amorphous thin layers made at least of titanium oxide and silicon oxide having the general stoichiometry $TiO_y$ and $SiO_x$ by means of a PICVD method at high power density and increased substrate temperatures ranging from 100° to 400° C., using small growth rates ranging from 1 nm/sec to 100 nm/sec so as to form an interference layer system having a thickness of less than 1200 nm and a minimized UV-active defective spot rate.

The design, according to the invention, of the interference layer for the UV-reflecting layer system composed of amorphous titanium oxide and silicon oxide layers, the standard elements, using small growth rates at temperatures ranging from 100° to 400° C. ensures, for the service life of the HID lamp, that UV photons which would otherwise escape from the quartz burner can be recaptured to a significant extent via reflectance in the plasma in the quartz burner for further generation of light in the visible range, thereby significantly improving the energy balance of the HID lamp. It has been shown that, at a wavelength of 360 nm, the interference coating according to the present invention results in a UV reflectance of 70%.

The PICVD method used, which is known sufficiently per se and therefore need not be explained in greater detail here, makes it possible—due to particular process parameters—to deposit the interference coating in the interior of the quartz burner and on the quartz burner in a relatively simple manner.

With regard for an inner coating, it has also been shown, surprisingly, that the inner coating is inert in the presence of the aggressive plasma medium.

The coating according to the present invention suffices, surprisingly, with the standard elements Si/Ti, without any doping elements such as C, H, N, and without heteroelements such as Al, Nb, Ta.

The use of the PICVD method also enables application on corresponding multistation systems, which advantageously results in a high throughput rate in the coating of quartz burners, in particular.

The interference coating has a thickness of <1200 nm, preferably <500 nm. Layers of this type are highly flexible. Furthermore, intrinsic stresses—which could cause the layer to peel off—can also be prevented with thin layers of this type. A typical layer construction includes approximately 50 alternating individual layers of Ti/Si oxide, with layer thicknesses of between 5 nm and 100 nm, whereby the thicknesses need not necessarily be distributed strictly equally. Instead, accumulations of small layer thicknesses can also occur; this depends on the design. The distribution of the layer thickness in the layer packet is therefore a mix in which thicknesses of 5 nm to 100 nm can occur in a mixed manner, e.g., extremely thin layers can occur frequently.

The very low attainable defective spot rate ensures very low UV absorption in the interference coating. What is meant here are structural defective spots, i.e., a very low inclusion of foreign elements. To improve the understanding of the present invention, the following will be noted:

In a quartz burner for HID lamps, a plasma is ignited in an appropriate glass jacket—the discharge vessel—in a gas mixture composed of metal halogenides and starter gas, e.g., xenon, with DC/AC at 100 to 300 Hz. UV photons bring about electron transitions in the atomic shells of the gases and emit:

a. Visible light, in a portion of approximately 40%; this yield should be as high as possible.
b. UV light. This portion is returned by the coating according to the present invention, and the additional photons obtained as a result bring about a higher yield of light waves in the visible range. As a result, the same light yield is possible while saving current.
c. An infrared portion, which can also be reflected.

Due to these effects, the burner surface with the reflectance layer packet according to the invention becomes, practically speaking, a band pass that allows only the light waves in the visible range to pass and reflects the wavelengths in the UV range or in the UV and infrared range into the interior of the burner.

Due to its UV-absorbing property, $TiO_2$ is normally unsuitable for use as a UV reflector. $SiO_2$ is reflecting, however, and has no absorption losses. Contrary to expectations, $TiO_2$ with $SiO_2$ as the usable reflecting layer is capable of being used in the layer design with 70% efficiency at $\lambda=360$ nm. The important point here is the defective spot rate, in order to attain the lowest absorption possible. The layer materials are deposited amorphously in the oxidic form at 350° C.

As a result of the measure according to the present invention, it is possible, contrary to expectations, to obtain reflecting interference systems inside and/or outside having high UV efficiency (absence of defective spots) and inertness in the presence of the plasma medium in the quartz burner for quartz burners for HID lamps by using types of alternating layers of $TiO_2/SiO_2$ known per se using small growth rates and high, preferably constant deposition temperatures which result in an improvement in the energy balance of these types of lamps.

Publication DE 199 62 144 A1 shows a UV-reflecting interference layer system composed of alternating layers of titanium oxide/silicon oxide for transparent substrates such as filters, eyeglasses, and for tubular jackets of discharge lamps, to increase the emitted light in a color-neutral manner while simultaneously increasing the UV protective effect. The publication also mentions deposition using chemical vapor deposition, supported with plasma, in particular.

In the case of the present invention, it is not the tubular jacket of the HID lamp that is coated, but rather the burner itself that is located therein, whereby, contrary to expectations, the layers applied to the burner according to the invention are inert in the presence of the aggressive plasma medium, which makes internal coating of the burner possible. Nor does this publication disclose the plasma impulse chemical vapor deposition method, i.e., the PICVD method, or, concretely, the process parameters used according to the invention.

The paper authored by M. Walther, et al., entitled "Multilayer barrier coating system produced by plasma-impuls chemical vapor deposition (PICVD)" in "Surface and Coatings Technology 80 (1996) 200-202", and DE 44 38 359 C2 describe methods for applying barrier layers composed of alternating layers of $TiO_2/SiO_2$ on plastics at relatively low temperatures. In the case of the present invention, deposition is carried out at higher temperatures (e.g., 350° C.) and in combination with small growth rates. This is the only way to create a UV-suitable absence of defective spots and inertness in the presence of the plasma medium. The layers known from the aforementioned publications do not fulfill these criteria.

Publication DE 195 30 797 A1 describes a composite material for protection against radiation in greenhouse systems, comprising a transparent carrier and an interference layer system deposited thereon, composed of alternating layers of $SiO_2/TiO_2$, among other substances. In this known case, vapor deposition layers are described that are entirely unsuitable for applications on lamp burners, in particular on the inside, due to their column growth.

Publication DE 44 32 315 A1 describes a mercury vapor lamp with a short arc having a discharge vessel made of quartz glass that is provided with a multilayer interference reflectance filter made of $TiO_2/SiO_2$ on the outside to suppress undesired, short-wave UV radiation below 365 nm, and which has an absorbing titanium oxide layer on the inside. In the case of the invention, however, the inner layer is also designed to be reflective. Furthermore, the deposition of layers using the PICVD method with the process parameters according to the invention is not described in the aforementioned publication, i.e., the known layers would be unsuitable for coating the burner of a HID lamp.

Publication DE 41 15 437 A1 shows a projection cathode ray tube with an optical multilayer interference filter for increasing the emitted light stream. This known layer system would also be entirely unsuitable for coating the burner of a HID lamp, because it is not deposited using the measures according to the invention.

Finally, publication DE-PS 34 30 727 shows an incandescent lamp with a sealed glass bulb and an optical interference film on the inner and/or outer surface of the glass bulb. The known layer system is only IR-reflecting, however; there is no mention of UV-suitability. Furthermore, the known layer system would not be suitable for coating the burner of a HID lamp, either, because it is not applied to the substrate using the measures according to the invention.

Preferably, a method for coating is provided, via which the titanium oxide and silicon oxide layers having the stoichiometry $TiO_2$ and $SiO_2$ are deposited by controlling the deposition parameters of the PICVD process. It has been shown that the best reflectance results are obtained by using alternating layers in accordance with the aforementioned "ideal stoichiometry".

A particularly low-stress coating in terms of intrinsic stresses may be obtained using a method via which a layer system having a thickness of less than 500 nm is applied.

Particularly good deposition results are obtained with a PICVD method in which a pulsed microwave method having a fundamental frequency of 2.45 GHz is used to generate the plasma, and in which the substrate formed by the quartz burner is maintained at a constant deposition temperature.

The substrate temperature can be held constant in a simple manner using a process method in which an $O_2$ plasma is run for substrate heating and the temperature is monitored optically by measuring the substrate surface.

Since the reflectance quality of the layer system is determined in a decisive manner by the PICVD method, a method is provided according to a further development of the invention, via which the process parameters for the PICVD method for applying the alternating layers of $TiO_2/SiO_2$ with a constant substrate temperature achieved using $O_2$-plasma substrate heating are selected as follows:

| Parameter | Substrate heating, $O_2$ plasma | Layers ($TiO_2/SiO_2$) |
|---|---|---|
| Process pressure (mbar) | 0.2 | 0.1-0.5 |
| Total mass flow (sccm) | 100 | 100-500 |
| Precursor concentration | — | 0.1-5% |
| MW power (%) | 70 | 30-60 |
| Pulse duration (ms) | 1-2 | 0.1-2.5 |
| Pulse pause (ms) | 2-4 | 10-300 |
| Constant temperature (° C.) | 350 | 350 |

Since the layer systems according to the invention are surprisingly inert in the presence of the plasma in the quartz burner, it is advantageously possible to coat the quartz burner on the inside of its jacket to achieve a high rate of recapture of UV photons.

It is also possible, however, to coat the quartz burner on the outside of the jacket, either as an alternative or in addition to the inner coating.

Since the method is robust and stable, on-line control of the layer growth is not carried out. Constant deposition rates can be run, with the advantage that the measurement of the layer thickness is reduced to a process of counting the microwave pulses.

BRIEF DESCRIPTION OF THE DRAWINGS

The invention will be described in greater detail with reference to an exemplary embodiment shown in the drawing.

DETAILED DESCRIPTION OF THE PREFERRED EMBODIMENTS

Figure 1:
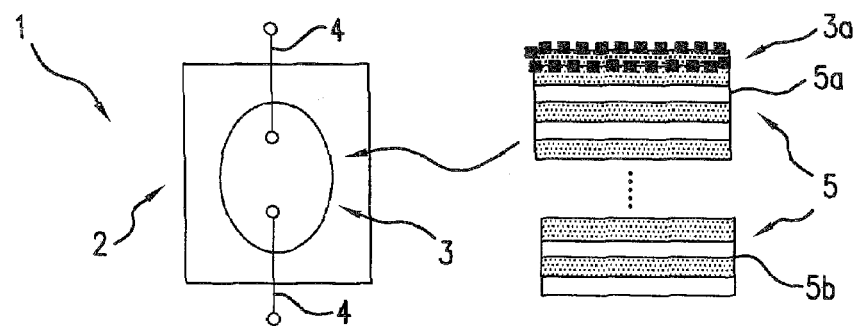
FIG. 1 is a schematic depiction of the design of a HID lamp with the coating according to the invention, shown as an enlargement of a section.

HID lamp 1 depicted in FIG. 1 is composed of a tubular jacket 2 and a quartz burner 3 with electrodes 4. "HID" is a technical term that stands for High Intensity Discharge.

The specific design and function of an HID lamp 1 of this type is known and therefore need not be explained further. As shown in the associated enlargement of a section, a UV-reflecting layer packet 5 is applied to the inner surface of burner wall 3*a*, the layer packet being composed of a large number, e.g., 50, of individual alternating layers made of Ti/Si oxide. Unshaded layers 5*a* represent Ti oxide layers, and shaded areas 5*b* represent Si oxide layers. The thickness of the individual layers typically ranges between 5 nm and 100 nm, whereby the thicknesses need not necessarily be distributed strictly equally; instead, accumulations of small layer thicknesses can also occur. This depends on the design. The layer thickness is preferably <1200 nm, however, because the layer then has high flexibility, and intrinsic stresses are prevented. As the number of individual layers increases, the layer thicknesses are therefore kept correspondingly smaller.

Layers 5*a*, 5*b* are amorphous Si/Ti oxide thin layers having the general stoichiometry $TiO_2$ and $SiO2$, because this allows the best reflectance results to be obtained.

Figure 2:
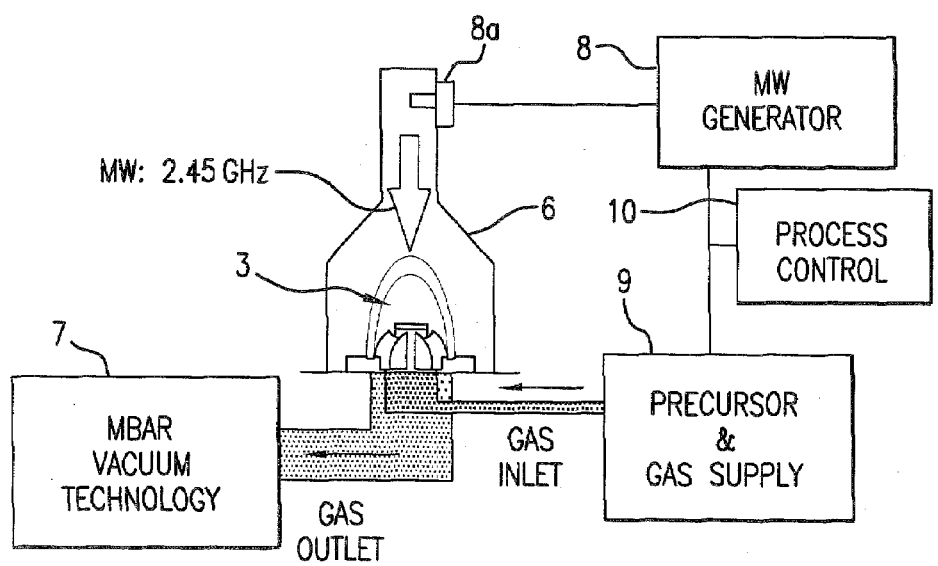
FIG. 2 is a block diagram of the design of a modified PICVD device for applying the layers according to the invention.

FIG. 2 shows a block diagram of the design of a device for the deposition of the layer system according to the invention on the inside of burner wall 3*a*. This is a PICVD system with a vacuum chamber 6 that accommodates quartz burner 3, in which a vacuum is maintained using a vacuum arrangement 7, and a pulsed plasma with a fundamental frequency of 2.45 GHz is generated using a microwave generator 8 coupled in at 8*a*.

The necessary gases are fed from a stage 9 into vacuum chamber 6, namely the gas in which the plasma is ignited—oxygen in this case—and, in an alternating manner, so is the particular precursor, out of which the Ti oxide and Si oxide layers are deposited in alternating fashion in combination with the oxygen plasma. The possible precursor gases for deposition of the aforementioned layers are sufficiently well-known. A process control 10 controls the entire course of the procedure, in particular the growth rate of the layers and their thickness. An on-line control of the layer growth is not necessary, because the process is robust and stable. Constant deposition rates can be achieved, so that the measurement of layer thickness is reduced to a procedure of counting microwave pulses. Another essential feature for the layer design is that deposition take place at increased substrate temperatures. In this case, quartz burner 3 is heated in simple fashion to approximately 350° C., for example, using the oxygen plasma, as is described in DE 40 08 400 C1 (column 8), for example. The layer materials of the precursor are then deposited amorphously in the oxidic form at 350° C. In general, the substrate temperature can be between 100° and 400° C.

Typical process parameters are:

| Parameter | Substrate heating, $O_2$ plasma | Layers ($TiO_2/SiO_2$) |
|---|---|---|
| Process pressure (mbar) | 0.2 | 0.1-0.5 |
| Total mass flow (sccm) | 100 | 100-500 |
| Precursor concentration | — | 0.1-5% |
| MW power (%) | 70 | 30-60 |
| Pulse duration (ms) | 1-2 | 0.1-2.5 |
| Pulse pause (ms) | 2-4 | 10-300 |
| Constant temperature (° C.) | 350 | 350 |

What is claimed is:

1. A method for coating a quartz burner of a HID lamp with a UV-reflecting layer system by alternatingly applying amorphous thin layers made at least of titanium oxide and silicon oxide by means of a PICVD method at high power density and increased substrate temperatures ranging from 100° to 400° C., using small growth rates ranging from 1 nm/sec to 100 nm/sec so as to form an interference layer system having a thickness of less than 1200 nm and a minimized UV-active defective spot rate.

2. The method as recited in claim 1, via which the titanium oxide and silicon oxide layers having the stoichiometry $TiO_2$ and $SiO_2$ are deposited with a defective spot rate of 0.1% to 1%.

3. The method as recited in claim 1, via which a layer system having a thickness of <500 nm is applied.

4. The method as recited in claim 2, via which a layer system composed of fifty alternating individual layers of $TiO_2$ and $SiO_2$ with layer thicknesses of between 5 nm and 100 nm is applied.

5. The method as recited in claim 4, via which the layer thicknesses of the individual layers in the layer system are different, and they are distributed differently.

6. The method as recited in claim 1 having a PICVD method, via which a pulsed microwave method with a fundamental frequency of 2.45 GHz is used for plasma generation.

7. The method as recited in claim 6, via which the substrate formed by the quartz burner is maintained at a constant deposition temperature.

8. The method as recited in claim 7, via which an $O_2$ plasma is run for substrate heating to maintain a constant temperature, and the temperature is monitored optically by measuring the substrate surface.

9. The method as recited in claim 8, via which the process parameters for the PICVD method for applying the alternating $TiO_2/SiO_2$ layers at a constant substrate temperature due to $O_2$ plasma substrate heating are selected as follows:

| Parameter | Substrate heating, $O_2$ plasma | Layers ($TiO_2/SiO_2$) |
|---|---|---|
| Process pressure (mbar) | 0.2 | 0.1-0.5 |
| Total mass flow (sccm) | 100 | 100-500 |
| Precursor concentration | — | 0.1-5% |
| MW power (%) | 70 | 30-60 |
| Pulse duration (ms) | 1-2 | 0.1-2.5 |
| Pulse pause (ms) | 2-4 | 10-300 |
| Constant temperature (° C.) | 350 | 350. |

10. The method as recited in claim 1, via which the quartz burner is coated in the inside of its jacket.

11. The method as recited in claim 1, via which the quartz burner is coated on the outside of its jacket.

12. The method as recited in claim 5, via which constant deposition rates are run, and the measurement of the layer thicknesses is carried out by counting the microwave pulses.

* * * * *

UNITED STATES PATENT AND TRADEMARK OFFICE
CERTIFICATE OF CORRECTION

PATENT NO. : 7,306,830 B2 Page 1 of 1
APPLICATION NO. : 10/502408
DATED : December 11, 2007
INVENTOR(S) : Moehl et al.

It is certified that error appears in the above-identified patent and that said Letters Patent is hereby corrected as shown below:

On the Title Page Item (75) Delete "Christopher" and substitute --Christoph--

Signed and Sealed this

Sixth Day of May, 2008

JON W. DUDAS
*Director of the United States Patent and Trademark Office*